US012670185B2

(12) United States Patent
Rhodes et al.

(10) Patent No.: US 12,670,185 B2
(45) Date of Patent: Jun. 30, 2026

(54) LEVERAGING EPISTEMIC CONFIDENCE FOR MULTI-MODAL FEATURE PROCESSING

(71) Applicant: Intel Corporation, Santa Clara, CA (US)

(72) Inventors: Anthony Rhodes, Portland, OR (US); Sovan Biswas, Bonn (DE); Giuseppe Raffa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/816,468

(22) Filed: Aug. 1, 2022

(65) Prior Publication Data

US 2022/0382787 A1 Dec. 1, 2022

(51) Int. Cl.
*G06F 7/00* (2006.01)
*G06F 16/28* (2019.01)

(52) U.S. Cl.
CPC .................................. *G06F 16/285* (2019.01)

(58) Field of Classification Search
CPC ...................................................... G06F 16/285
USPC .......................................... 707/600–899, 736
See application file for complete search history.

(56) References Cited

U.S. PATENT DOCUMENTS

2021/0224687 A1* 7/2021 Goldszmidt .......... G06F 18/214

* cited by examiner

*Primary Examiner* — Isaac M Woo
(74) *Attorney, Agent, or Firm* — Nicholson De Vos Webster & Elliott LLP

(57) ABSTRACT

Systems, apparatuses, and methods include technology that extracts a plurality of features from the input data. The technology generates a confidence metric for the plurality of features. The confidence metric corresponds to a degree that at least one feature of the plurality of features is relevant for classification of the input data. The technology categorizes the input data into a category based on the plurality of features and the confidence metric.

25 Claims, 9 Drawing Sheets

300

Begin

Extract a plurality of features from the input data

302

Generate a confidence metric for the plurality of features, wherein the confidence metric corresponds to a degree that at least one feature of the plurality of features is relevant for classification of the input data

304

Categorizes the input data into a category based on the plurality of features and the confidence metric

306

End

300

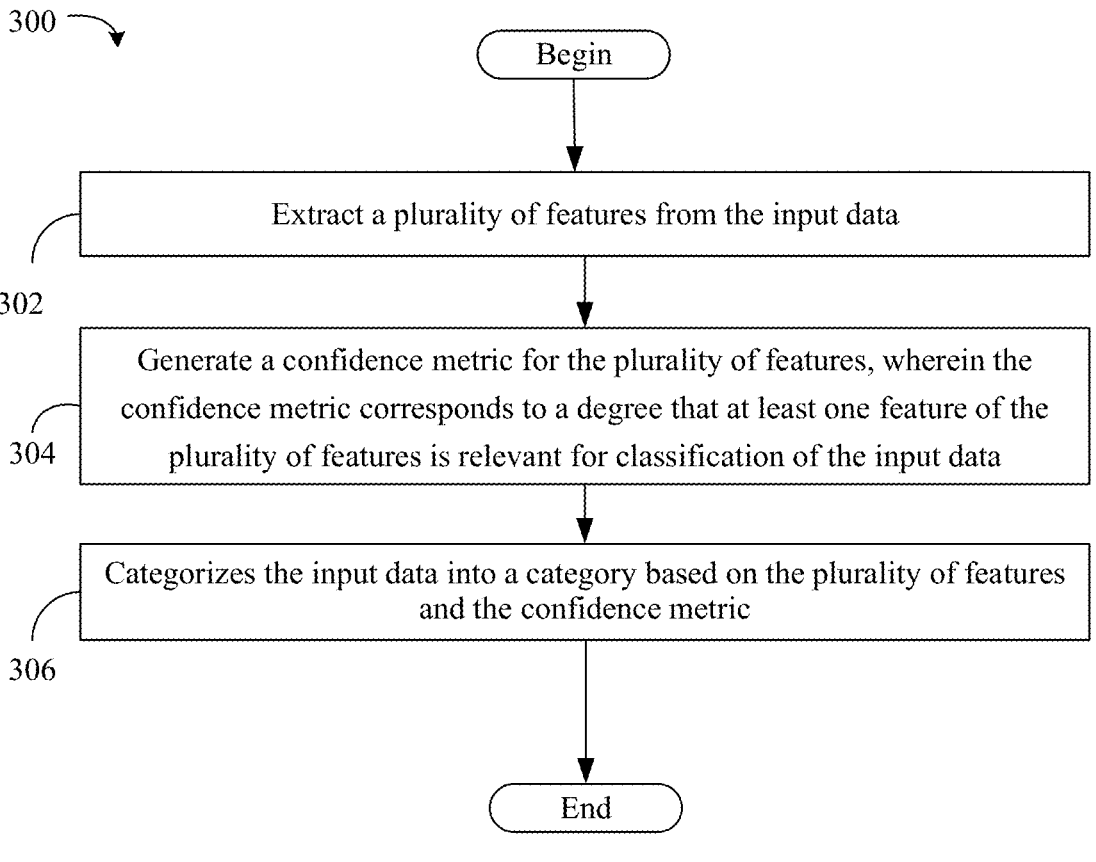

Begin

Extract a plurality of features from the input data

302

Generate a confidence metric for the plurality of features, wherein the confidence metric corresponds to a degree that at least one feature of the plurality of features is relevant for classification of the input data

304

Categorizes the input data into a category based on the plurality of features and the confidence metric

306

End

FIG. 2

LEVERAGING EPISTEMIC CONFIDENCE FOR MULTI-MODAL FEATURE PROCESSING

TECHNICAL FIELD

Embodiments generally relate to a multi-modal feature processing system that categorizes input data. More particularly, embodiments relate to a calculating a confidence metric with respect to features of the input data, and classifying the input data based on the features and the confidence metric.

BACKGROUND

Some real-world systems (e.g., human-in-the-loop paradigms) rely on the ingestion of different feature modalities. Such systems may incur high compute and memory constraints. Some artificial intelligence (AI) systems require real-time inference at deployment, but may not be able to meet such time requirements due to concurrent compute and memory constraints which reduce the speed of the processing. Accuracy may be reduced in an effort to meet the compute and memory constraints while also executing real-time processing. Doing so may increase an error rate and result in sub-optimal performance.

BRIEF DESCRIPTION OF THE DRAWINGS

The various advantages of the embodiments will become apparent to one skilled in the art by reading the following specification and appended claims, and by referencing the following drawings, in which:

FIG. 2 is a flowchart of an example of a method of executing an epistemic based categorization according to embodiments herein according to an embodiment;

DESCRIPTION OF EMBODIMENTS

Embodiments relate to a system that may categorize frames based on a set of variegated data modalities. The variegated data modalities enhance the performance of AI systems by providing a rich substrate of features relevant for downstream tasks (e.g., fine-grain video action recognition, categorization, etc.). Embodiments include an enhanced and performant process to judiciously fuse multi-modal features based on epistemic confidence (e.g., confidence metric(s)) for downstream tasks. For example, embodiments generate epistemic confidence measures (e.g., epistemic confidence gains) for different multi-modal features with a lightweight neural network (e.g., a neural network, AI network, a temporal network (TN) such as a temporal convolutional network (TCN), etc.). Embodiments thus calculate an epistemic confidence gain (ECG) with respect to each feature for each temporal step. The ECG may quantify a degree that the inclusion of a particular feature increases or decreases model confidence at a particular juncture and/or correspond to a degree that the particular feature is relevant for classification of the input data. Embodiments calibrate a dynamic multi-modal data fusion process based on the ECG to amplify the influence of informative features, and diminish the influence of and/or exclude less informative features.

Figure 1:
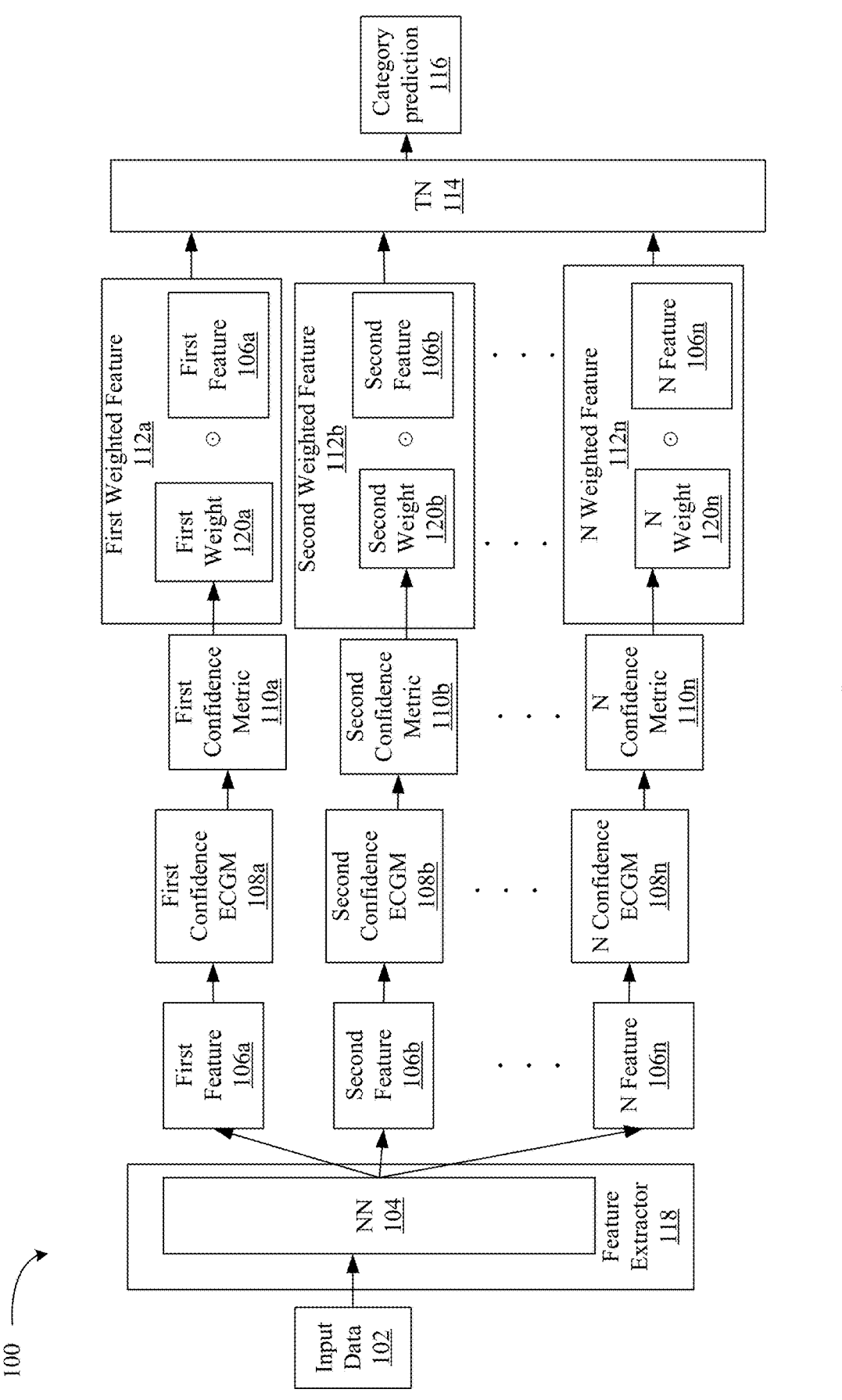
FIG. 1 is an example of a multi-modal feature processing architecture according to an embodiment.

FIG. 1 illustrates a multi-modal feature processing architecture 100. The architecture 100 includes input data 102 (e.g., sensors data, audio data, hand tracking data, language data, video stream data, object localization data, semantic segmentation data, etc.). In some embodiments, the input data 102 may be a single frame of a video feed. A feature extractor 118 extracts a first-N features 106a-106n (e.g., a plurality of features) from the input data 102. The first-N features 106a-106n may relate to different data modalities (e.g., a video feed may include both audio and visual modalities) associated with the same event and/or action.

For example, suppose that the setting of a temporally evolving process (e.g., hand movement in a manufacturing environment) comprises several distinct data modalities (M total). These data modalities may be represented by a first array presented below, where each of the vectors (a vector is enclosed within each pair of parenthesis) includes features of a same modality for different temporal steps (e.g., frames of a video):

$$\{(d_1^{(1)}, \dots, d_1^{(T)}), \dots, (d_M^{(1)}, \dots, d_M^{(T)})\} \qquad \text{First Array}$$

In the first array, the subscript indicates a data modality index (e.g., each index corresponds to a different modality) and the superscript indicates the temporal step (max is T where the different values denotes different temporal steps). Thus, the first array may include features from previous temporal steps. In this example, the $d_1$ vector may be associated with video frame features, while the vector $d_m$ may be associated with audio features corresponding to the video frame. As noted, the first array includes features not only from a present temporal step T, but also from previous temporal steps 1 to T−1. In each of the previous temporal steps 1 to T−1, the process described herein may execute to generate features (as well as baseline and confidence metrics discussed below) and stored as described herein.

In this embodiment, a neural network 104 may extract the features 106a-106n. The neural network 104 may comprise a 3D convolutional neural network (CNN) architecture to extract global frame-wise features from raw video which are illustrated as the first-N features 106a-106n. It will be understood that other extraction architectures may be appropriate for features extraction.

The first confidence Epistemic Confidence Generation Module (ECGM)-N confidence ECGM 108a-108n process the first-N features 106a-106n to generate first confidence metric 110a-110n (e.g., ECGs). For example, the first confidence ECGN-N confidence ECGN 108a-108n may be a neural network, AI network and/or first temporal networks (first TNs such as first TCNs). For example, each of the first-N confidence ECGMs 108a-108n may be a different TCN.

A TCN may execute a dilated causal convolution. For example, the TCN may employ casual convolutions and dilations to be adaptive for sequential data with its temporality and large receptive fields.

Each respective ECGM of the first-N ECGMs 108a-108n executes 1-D convolutions with residual connections for improved feature processing efficiency. Various stages in the respective ECGM initially applies a 1×1 convolution for feature dimension standardization, followed by variable-size 1-D dilated convolutions. Such dilated convolution operations increase the effective receptive field of the respective ECGM, allowing the respective ECGM to effectively learn long-range temporal dependences in the input data 102. The output of the respective ECGM is a frame-wise set of logits (corresponding with frame-wise class predictions or confidence metric).

Each ECGM of the of the first-N ECGMs 108a-108n is trained independently for a given feature. For example, each respective ECGM of the first-N ECGMs 108a-108n may be trained with respect to a different modality (e.g., audio, visual, hand-tracking, object localization, etc.), and processes features of the first-N features 106a-106n that are associated with the different modality of the respective ECGM. For example, the first confidence ECGM 108a may trained based on a video modality (e.g., is trained on video data). The first feature 106a may be a video modality (e.g., is a video feature), and thus the architecture 100 provides the first feature 106a to the first confidence ECGM 108a based on both the first confidence ECGM 108a and the first feature 106a being associated with the same modality (i.e., video modality). The second confidence ECGM 108a may trained on an audio modality (e.g., is trained on audio data). The second feature 106b may be an audio modality (e.g., is audio data), and thus provided to the second confidence ECGM 108b based on both the second confidence ECGM 108b and the first feature 106a being associated with the same modality (i.e., audio modality). Thus, the architecture 100 may match the first-N features 106a-106n to the first-N ECGMS 108a-108n based on data modalities of the first-N features 106a-106n and the first-N ECGMS 108a-108n. That is, for each respective feature of the first-N features 106a-106n, the architecture 100 will identify the data modality of the respective feature, identify a respective ECGM of the first-N ECGMs 108a-108n that is trained on the data modality and assign the respective feature to the respective ECGM for processing based on the ECGM being trained on the data modality of the respective feature.

In some embodiments, one of the first-N ECGMS 108a-108n may be a "baseline" ECGM which solely operates on a primary input modality (e.g., video stream features) out of the available data modalities. For example, the primary input modality may mean the modality that is necessary to identify a category. For example, input data 102 may include both audio and video modalities. If the architecture 100 is to identify an action category for an action in the input data 102, the video modality may be deemed to be the primary modality based on the video modality being necessary to identify the action category. The audio modality may provide hints as to the action category, however, the video modality may be considered necessary to determining the action category. The primary input modality may be interpreted as the "baseline" data modality used for class prediction. In some embodiments, the baseline data modality may comprise any of the available modalities (or combinations thereof). That is, some embodiments operate such that when evaluating the other data modalities (e.g., object localization, hand localization, audio cues, etc.), the embodiments gauge whether or not to trust the inclusion of these other modalities to improve model prediction vis-à-vis model using solely the primary input modality. In some embodiments, the baseline ECGM may generate baselines for all modalities, and each of the baselines may be compared to at least one feature that matches the modality of the baseline to determine whether the feature is relevant for categorization. The baseline ECGM may output a baseline metric (e.g., a baseline ECG) of the primary input modality. For example, the baseline metric may reflect a baseline relevance of all features of the input data 102 (e.g., an average relevance of the input data 102). PAs explained below, embodiments may adjust the weightings of the first-N features 106a-106n based on comparisons of the baseline metric to the first-N confidence metrics 110a-110n. All other feature-based ECGMs of the first-N confidence ECGMs 108a-108n (i.e., not the baseline ECGM) receive a (frame-wise) concatenation of various features (e.g., video stream) with a single data modality (e.g., hand localization features, audio, video, etc.). Each of the first-N confidence ECGMs 108a-108n may be trained using various predictive loss functions, including cross-entropy, etc.

As illustrated, the first-N ECGMs 108a-108n generate first confidence metric 110a-N confidence metric 110n. Each of the first confidence metric 110a-N confidence metric 110n may be an ECG, a value reflecting the degree of confidence that a particular feature provides a relevant insight into classification of the input data 102, and/or a value that corresponds to a degree that the particular feature is relevant for classification of the input data 102. Thus, the first-N confidence ECGMs 108a-108n determine relevant features of the first-N features 106a-106n that are relevant for classification, and increase confidence metrics of the first-N confidence metrics 110a-110n associated with the relevant features relative to other features of the first-N features 106a-106n that are not determined to be relevant. For example, if the first confidence ECGM 108a determines that the first feature 108a is relevant for categorization, the first confidence metric 110a may be relatively high. If the second confidence ECGM 108b determines that the second feature 106b is not relevant for categorization, the second confidence metric 110b may be relatively lower and would be smaller than the first confidence metric 110a.

The architecture 100 then generates first-N weights 120a-120n based on the first-N confidence metrics 110a-110n. For example, the architecture 100 generates larger weights when confidence metrics of the first-N confidence metrics 110a-110n correspond to higher confidence levels. The architecture 100 generates smaller weights when confidence metrics of the first-N confidence metrics 110a-110n correspond to lower confidence levels.

In some examples, each respective confidence metric of the first-N confidence metrics 110a-110n that is associated with the primary input modality of the baseline metric, is compared to the baseline metric (e.g., a value reflective of an average relevance of all features) described above. If a difference between the respective confidence metric and the baseline metric fails to meet a threshold, the respective confidence metric may be deemed noise and the weight associated with the respective feature is set to a low value or zero to reduce the influence of the respective feature in the final analysis. If the difference between the respective confidence metric and the baseline metric meets the threshold, the respective confidence metric may be deemed to be significant and the weight associated with the respective feature is set to a high value greater than the low value to amplify the influence of the respective feature in the final analysis.

The architecture 100 may then generate first-N weighted features 112a-112n based on the first-N feature 106a-106n and the first-N confidence metrics 110a-110n. For example, the first-N weighted features 112a-112n may be dot products of the first-N weights 120a-120b and the first-N features 106a-106n. For example, the first weighted feature 112a is a dot product of the first weight 120a and the first feature 106a, the second weighted feature 112b is a dot product of the second confidence metric 110b and the second weight 120b, etc.

In some embodiments, the architecture 100 generates a fusion-weighting array for each feature modality at each temporal step, which is represented in Array 2 below:

$$\{(fw_1^{(1)}, \dots, fw_1^{(T)}), \dots, (fw_M^{(1)}, \dots, fw_M^{(T)})\} \qquad \text{Array 2}$$

In Array 2, the subscript indicates the data modality index and the superscript indicates the temporal step (max is T). The fusion-weighting array may correspond to the first-N weights 120a-120n and is thus based on the first-N confidence metrics 110a-110n. For example, if the input data 102 corresponds to a frame at step T, then the first-N weights 120a-120n would correspond to $$fw_1^{(T)} \text{ to } fw_M^{(T)}.$$

Thus, the fusion weighting array may include weights from previous temporal steps (e.g., previous frames at times 1 to T−1) as well as a current step (e.g., a current frame at time T). For example, $$fw_1^{(1)} \text{ and } fw_M^{(1)}$$

may be weights from a first temporal step, $$fw_1^{(2)} \text{ and } fw_M^{(2)}$$

(not illustrated in Array 2) are weights from temporal step 2 and so on. The current first-N weights 120a-120n are thus appended to an appropriate data modality (each vector within a set of parentheses is a different modality weight vector including weights of a data modality at different temporal steps). That is, each weight of the first-N weights 120a-120n are added to a vector that is associated with the same data modality as the weight.

The fusion-weighting array may be used to better calibrate each feature modality during a data fusion operation that generates the first-N weighted features 112a-112n for a particular downstream inference task (e.g., fine-grain action segmentation). The calibration operation amounts to a simple element-wise multiplication of the data features and the re-weighting arrays which is illustrated below in equation 1:

$$(fw_n^{(1)}, \dots, fw_n^{(T)}) \odot (d_n^{(1)}, \dots, d_n^{(T)}) \qquad \text{Equation 1}$$

In Equation 1, n corresponds to a data modality index while the superscript corresponds to a temporal step. The architecture will execute an element-wise multiplication according to Equation 1 for each data modality index of data modality indexes 1-M. In the present example, the first-N weighted features 112a-112n correspond to the element-wise multiplication of the $$fw_n^{(T)} \text{ and } d_n^{(T)}$$

where n ranges from 1-m, thus generating m weighted features. Thus, embodiments weight the features 106a-106n based on the weighting array to generate first-N weighted features 112a-112n. Similar to above, Equation 1 includes weights and features from previous temporal steps (e.g., previous frames at times 1 to T−1) as well as a current step (e.g., a current frame at time T).

A TN 114 (e.g., a second TCN that is larger than the first TCNs and calibrated to identify categories) may then process the first-N weighted features 112a-112n (e.g., calibrated features). The TN 114 may also receive the weighted features from previous temporal steps (not illustrated) as described above. The TN 114 categorizes the input data 102 into a category prediction 116 based on the first-N weighted features 112a-112n (and in some cases the weighted features from previous temporal steps). For example, if the input data 102 is a video, the category prediction 116 may be a specific action (e.g., an action that is presently occurring) in the video. If the input data 102 is an audio feed, the category prediction 116 may be a specific command. The TN 114 may generate the category prediction 116 not just based on the first-N weighted features associated with a present temporal step (e.g., step T), but based on weighted features from other temporal steps (e.g., step 1 to step T−1). Notably, each of the aforementioned processes may execute in real-time to provide on-the fly guidance and control in active environments (e.g., industrial environments). While TNs are described above, it will be understood that other types of neural networks may be equally applicable such as a neural network and/or AI network. Thus, a neural network and/or AI network may be substituted for the TN 114.

Thus, embodiments relate to multi-modal feature processing that is able to operate in a real-world systems and execute in real-time. Other techniques for multi-modal feature processing employ down sampling or generic dimensionality reduction in order to accommodate system bottlenecks. Such processes often come at the cost of degrading feature fidelity or introducing unwanted noise, resulting in suboptimal system performance.

Present embodiments include an efficient, low-compute process that leverages a learnable, feature-based epistemic confidence in order to amplify and/or diminish the influence of multi-modal features for downstream tasks. Such a method may be referred to an Epistemic Confidence Calibrated Features (ECCF). Such processes may be streamlined with existing workflows in an end-to-end manner, and thus requires minimal to no data curation or model training. Embodiments may be employed with real-world data for the task of fine-grain video action segmentation. Moreover, embodiments operate at a granular basis and may operate on a per time step basis. For example, if the input data 102 is related to a video, the architecture 100 may provide a category prediction (e.g., predicted action occurring in the video) for each frame of the video in real time. Additionally the architecture 100 may be incorporated into numerous technological environments, including autonomous driving, manufacturing, stores, etc.

FIG. 2 shows a method 300 of executing an epistemic based categorization according to embodiments herein. The method 300 may generally be implemented with the embodiments described herein, for example, the multi-modal feature processing architecture 100 (FIG. 1) already discussed. More particularly, the method 300 may be implemented in one or more modules as a set of logic instructions stored in a machine- or computer-readable storage medium such as random access memory (RAM), read only memory (ROM), programmable ROM (PROM), firmware, flash memory, etc., in hardware, or any combination thereof. For example, hardware implementations may include configurable logic, fixed-functionality logic, or any combination thereof. Examples of configurable logic include suitably configured programmable logic arrays (PLAs), field programmable gate arrays (FPGAs), complex programmable logic devices (CPLDs), and general purpose microprocessors. Examples of fixed-functionality logic include suitably configured application specific integrated circuits (ASICs), general purpose microprocessor or combinational logic circuits, and sequential logic circuits or any combination thereof. The configurable or fixed-functionality logic can be implemented with complementary metal oxide semiconductor (CMOS) logic circuits, transistor-transistor logic (TTL) logic circuits, or other circuits.

For example, computer program code to carry out operations shown in the method 300 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 302 extracts a plurality of features from the input data. Illustrated processing block 304 generates a confidence metric for the plurality of features, wherein the confidence metric corresponds to a degree that at least one feature of the plurality of features is relevant for classification of the input data. Illustrated processing block 306 categorizes the input data into a category based on the plurality of features and the confidence metric.

In some embodiments, the method 300 further includes generating a weighting array for the plurality of features based on the confidence metric. In such embodiments, the method 300 further includes weighting the plurality of features based on the weighting array to generate weighted features, and where the categorizing comprises processing the weighted features with a temporal network.

In some embodiments, the confidence metric includes confidence metrics, and the method 300 further comprises generating a baseline metric associated with baseline features of the input data, generating weights based on a comparison of the baseline metric to the confidence metrics and adjusting the plurality of features based on the weights to generate weighted features. In such embodiments, the categorizing comprises processing the weighted features with a temporal network. Furthermore, in such embodiments, the generating the weights comprises identifying a difference between a first confidence metric of the confidence metrics and the baseline metric, determining whether the difference meets a threshold, when the difference meets the threshold, setting a first weight of the weights associated with the first confidence metric to a first value, where the first value is determined based on the difference, and when the difference fails to meet the threshold, setting the first weight to a predetermined value.

In some embodiments, the category is an action category, the input data is further associated with a plurality of data modalities, and the input data includes one or more of sensor data, language data, audio data, hand tracking data, video stream data, object localization data, or semantic segmentation data. In some embodiments, the extracting the plurality of features comprises processing the input data with a convolutional neural network, and the plurality of features is associated with a same video frame.

The method 300 may thus generate confidence metrics for multi-modal features with lightweight networks (e.g., a TN or TCN) resulting in less memory and compute overhead. Moreover, the method 300 enhances efficiency and accuracy by identifying the confidence metrics and amplifying the influence of features associated with confidence metrics representing a high degree of relevance for categorization (e.g., action classification), and decreasing the influence of feature associated with confidence metrics representing low degrees of relevance for categorization.

Figure 3:
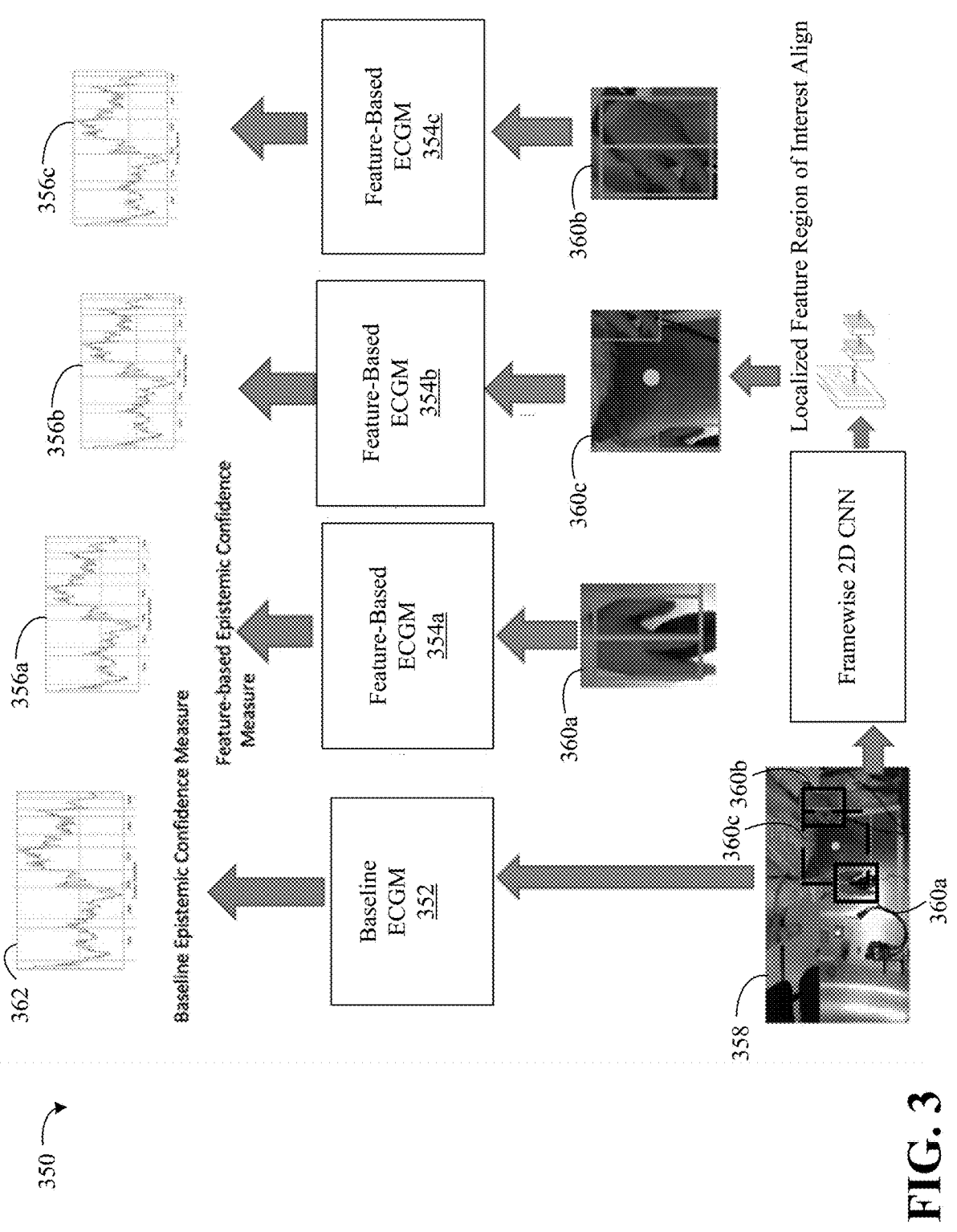
FIG. 3 is a process of an example of multi-modal feature processing according to embodiments herein according to an embodiment.

FIG. 3 illustrates a multi-modal feature process 350 depicting global (e.g., baseline) and localization-based features, as well as a baseline ECGM 352 and feature-based ECGMs 354a-354c. The multi-modal feature process 350 may generally be implemented with the embodiments described herein, for example, the multi-modal feature processing architecture 100 (FIG. 1) and/or method 300 (FIG. 2) already discussed. The baseline ECGM 352 and feature-based ECGMs 354a-354c generate per-frame epistemic confidence measures as described herein.

Each of feature-based ECGMs is trained independently for a given feature modality. Additionally, the baseline ECGM 352 operates on solely on the primary input modality (e.g., all video stream feature which may be a frame) of frame 358. Frame 358 may comprise a video stream and audio stream corresponding to the video stream. The feature-based ECGMs 354a-354c receive a (frame-wise) concatenation of baseline features (e.g., video stream) with a single data modality (e.g., hand localization features in this example). Each of the baseline and feature-based ECGMs 352, 354a-354c may be trained using predictive loss functions, including cross-entropy, etc. Embodiments define the i-th feature-specific epistemic confidence at time step t as the max of the logit expressed in Equation 2:

$$EC_i^{(t)} = \max\left(EC_i^{(t)}(1), \ldots, EC_i^{(t)}(C)\right) \qquad \text{Equation 2}$$

In Equation 2, C represents the number of classes in the logit set. Embodiments calculate the epistemic confidence for each individual feature illustrated in first-third object regions-of-interest (ROI) 360a-360c and additionally for the baseline feature of the entire frame 358 (e.g., all of the illustrated image).

In this example, the method 300 generates first and second ROIs 360a, 360b so that the first ROI 360a includes the localization of the left hand of a manufacturing technician (e.g., an object localization rendered feature), the second ROI 360b includes the right hand of the manufacturing technician (e.g., (e.g., an object localization rendered feature), in addition to the third ROI 360c (e.g., a general ROI) that captures the region between the localized left and right hands. Each of the first, second and third ROIs 360a, 360b, 360c serves as an input to a respective feature-based ECGM 354a, 354b, 354c. The entire frame 358 also serves as an input to the baseline ECGM 352.

Thus, the present embodiment considers four feature modalities in total: 1) the left hand in the second ROI 360b, 2) the right hand in the first ROI 360a, 3) the general area between the left and right hands in the third ROI 360c, and 4) a global overview of the entire frame 358. The localization information in the first-third ROIs 360a-360c as well as the global frame 358 is used to extract 2D CNN-based features. Subsequently, these feature embeddings are ingested by the feature-based ECGMs 354a-354c and the baseline ECGM 352 as shown in FIG. 3.

Finally, given an i-th feature-specific epistemic confidence at each time step $$\left( EC_i^{(t)} \right),$$

embodiments may calculate the fusion-weighting value for each feature at each time step using the following Equation:

$$fw_i^{(t)} = \begin{cases} 0 & EC_i^{(t)} - EC_b^{(t)} < \tau \\ EC_i^{(t)} - EC_b^{(t)} & \text{else} \end{cases} \quad \text{Equation 3}$$

In Equation 3, $$EC_i^{(t)}$$

denotes the ith feature-specific epistemic confidence (e.g., the confidence metric) at step t, $$EC_b^{(t)}$$

denotes the baseline epistemic confidence of the baseline feature (e.g., global image feature embedding) and is generated by the baseline ECGM 352 based on the entire frame 358. The baseline epistemic confidence is graphically illustrated in the baseline epistemic confidence measure 362. In this example, the baseline epistemic confidence measure 362 is illustrated over a plurality of time intervals. The feature-based epistemic confidence measures are illustrated in graphs 356a, 356b, 356c. In Equation 3, $\tau$ is a thresholding hyperparameter (e.g., $\tau=0$ in some examples). According to Equation 3, if the difference between the epistemic confidence $$EC_i^{(t)}$$

of the i-th feature-specific and the ith feature $$EC_b^{(t)}$$

is less than $\tau$, the feature is determined to be non-informative, and the influence is therefore diminished and/or muted (e.g., $\varepsilon=0$ in some examples) by setting the fusion-weighting value $$fw_i^{(t)}$$

to a predetermined value (e.g., 0). Otherwise, if the ith feature is considered informative $$\left( \text{i.e., } EC_i^{(t)} - EC_b^{(t)} \geq \tau \right),$$

the fusion-weighting value $$fw_i^{(t)}$$

is amplified by factor $$EC_i^{(t)} - EC_g^{(t)}.$$

In some embodiments, the fusion-weighting value $$fw_i^{(t)}$$

may be set based on a function of $$EC_i^{(t)} - EC_g^{(t)},$$

where the function scales $$fw_i^{(t)}$$

based on the difference to increase $$fw_i^{(t)}$$

as the difference increases, and decrease $$fw_i^{(t)}$$

as the difference decreases.

Figure 4:
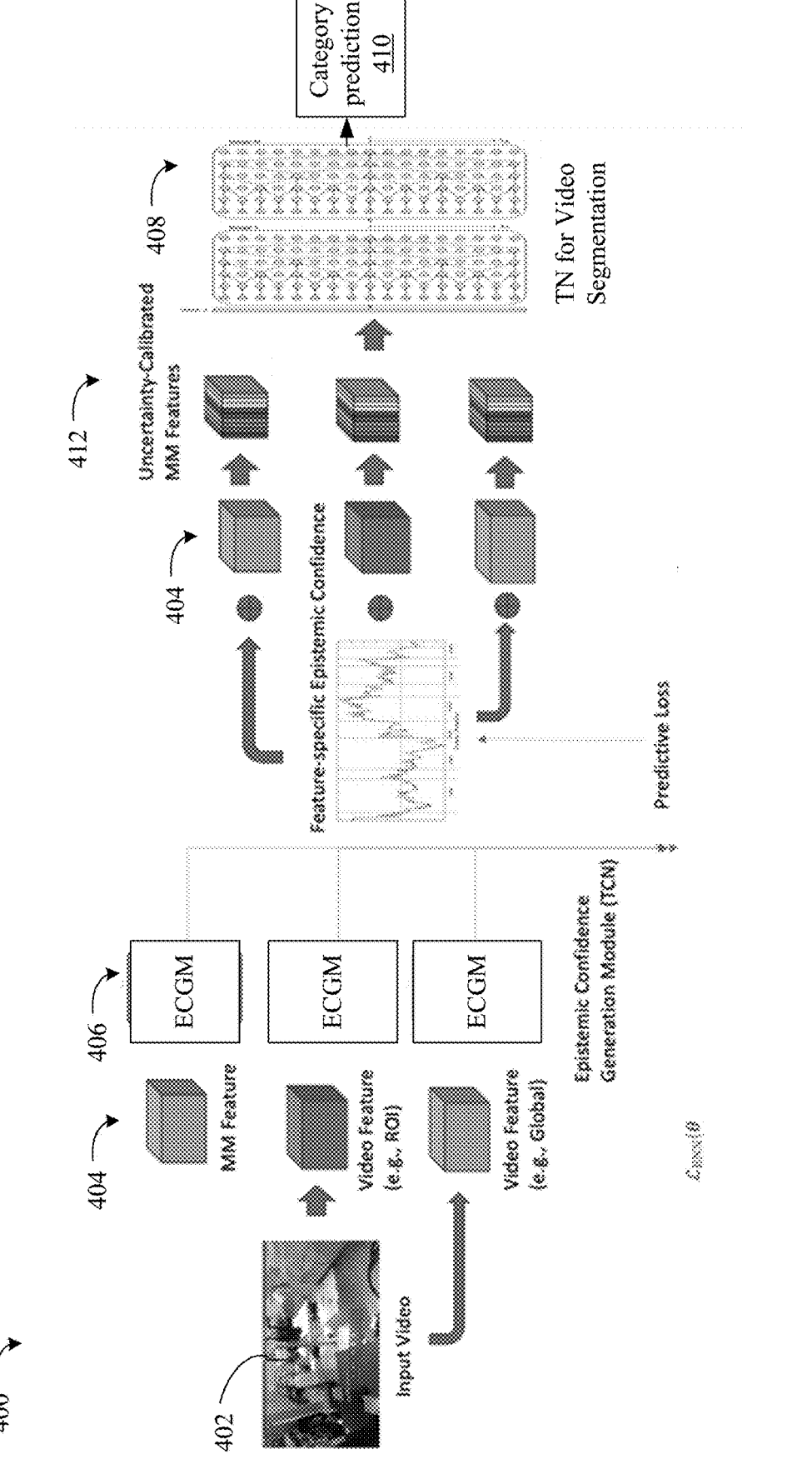
FIG. 4 is an example of an epistemic confidence processing architecture according to an embodiment.

FIG. 4 illustrates an epistemic confidence processing architecture 400. The epistemic confidence processing architecture 400 may generally be implemented with the embodiments described herein, for example, the multi-modal feature processing architecture 100 (FIG. 1), method 300 (FIG. 2) and/or multi-modal feature process 350 (FIG. 3) already discussed. An input video 402 is analyzed to extract various features 404 including a multi-modal (MM) feature, video feature (e.g., a region of interest) and a video feature (e.g., a global baseline feature). ECGMs 406 generates a predictive loss that is a feature-specific epistemic confidence. The predictive loss may be provided by the following Equation 4:

$$L_{enn}(\theta) =$$

$$E_{p_{(x,y)}}\left[\int \|y - \pi\|^2 * p(\pi|x, \theta)d\pi + \lambda_t * KL(Dir(\pi|\alpha^-\|Dir(\pi|u))\right]$$

Equation 4

The predictive loss includes epistemic confidences (e.g., confidence metric). The feature specific epistemic confidences are then multiplied with the features 404 to generate uncertainty-calibrated multi-modal features 412 (e.g., weighted features). A TN 408 (e.g., a TCN) may receive the uncertainty-calibrated multi-modal features 412 and generate a category prediction 410 based on the uncertainty-calibrated multi-modal features 412.

Figure 5:
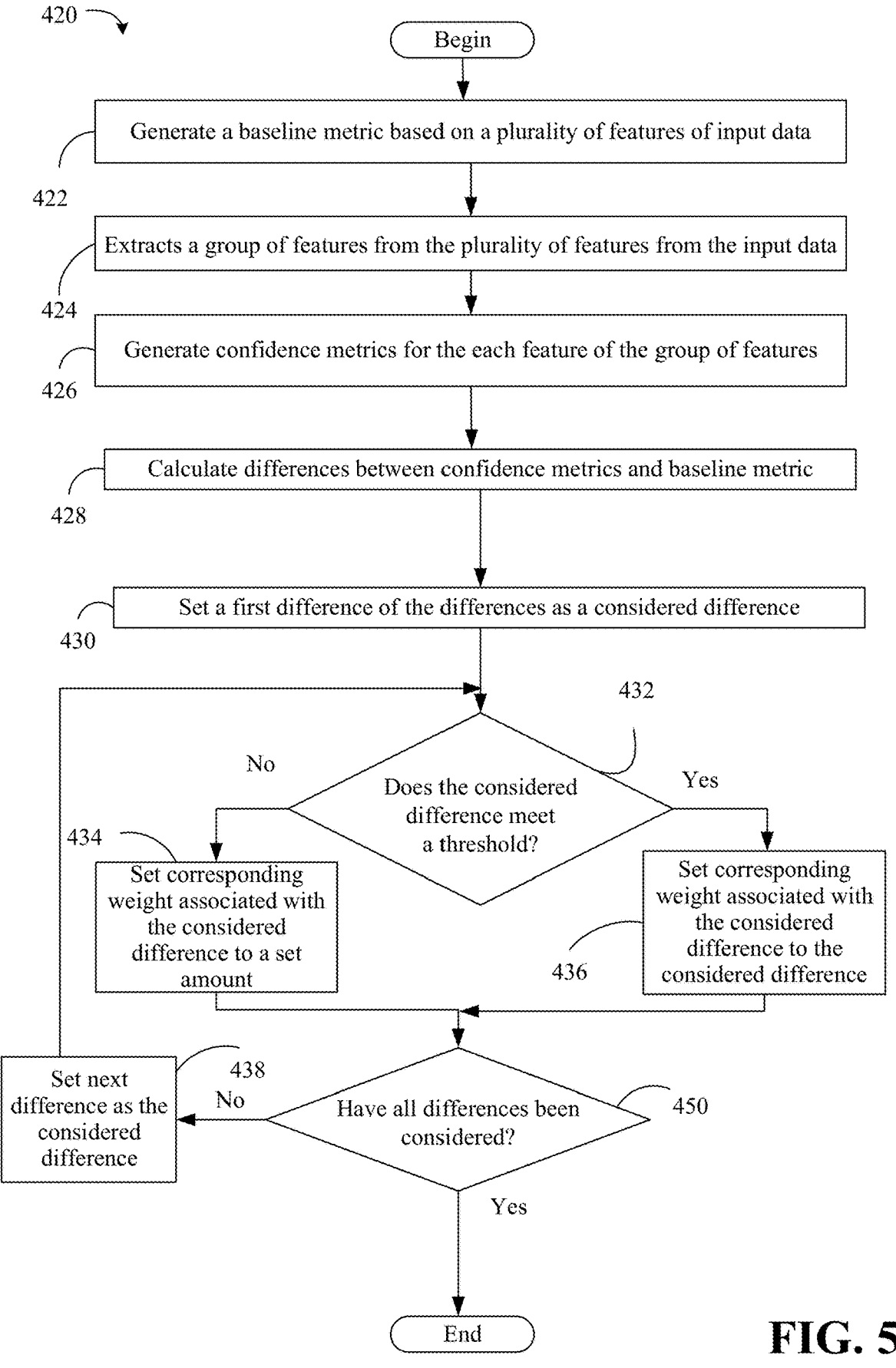
FIG. 5 is a flowchart of an example of a method of weighting features based on baseline metrics and confidence metrics according to embodiments herein according to an embodiment.

FIG. 5 shows a method 420 of weighting features based on baseline metrics and confidence metrics. The method 420 may generally be implemented with other embodiments described herein, for example, the multi-modal feature processing architecture 100 (FIG. 1), method 300 (FIG. 2), multi-modal feature process 350 (FIG. 3) and/or epistemic confidence processing architecture 400 (FIG. 4) already discussed. The method 420 may be implemented in one or more modules as a set of logic instructions stored in a machine- or computer-readable storage medium such as RAM, ROM, PROM, firmware, flash memory, etc., in hardware, or any combination thereof. For example, hardware implementations may include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

Illustrated processing block 422 generate a baseline metric based on a plurality of features of input data. In some embodiments, the baseline metric may be based on all features of the input data and/or all of the input data of a primary modality. Illustrated processing block 424 extracts a group of input features from the input data. To do so, block 424 may extract the group of features from the plurality of features by selecting features related to a particular category, such as an action occurring with hands or hand modality. Illustrated processing block 426 generates confidence metrics for each feature of the group of features. Illustrated processing block 428 calculates difference between confidence metrics and the baseline metric.

Illustrated processing block 430 sets a first difference of the differences as a considered difference. Illustrated processing block 432 determines if the considered difference meets a threshold (e.g., is equal to or is greater than the threshold). If so, illustrated processing block 436 sets a corresponding weight (e.g., a weight associated with the confidence metric presently under consideration or associated with the difference) associated with the considered difference to the considered difference. In some embodiments, the weight is set to a predetermined value or to another value (e.g., a higher value) that is determined based on the considered difference. If the considered difference does not meet the threshold, illustrated processing block 434 sets the corresponding weight associated with the considered difference to a set amount (e.g., a lower value that is lower than the higher value). In some embodiments, rather than a threshold being considered, the weight may be scaled proportionally based on the difference such that larger differences increase the weights to increase the influence of features, while smaller differences decrease the weights to decrease the influence of features.

Illustrated processing block 450 determines if all differences have been considered. If not, processing block 438 sets a next difference (that has not yet been considered) as the considered difference and processing block 432 executes. Otherwise the method 420 ends.

Figure 6:
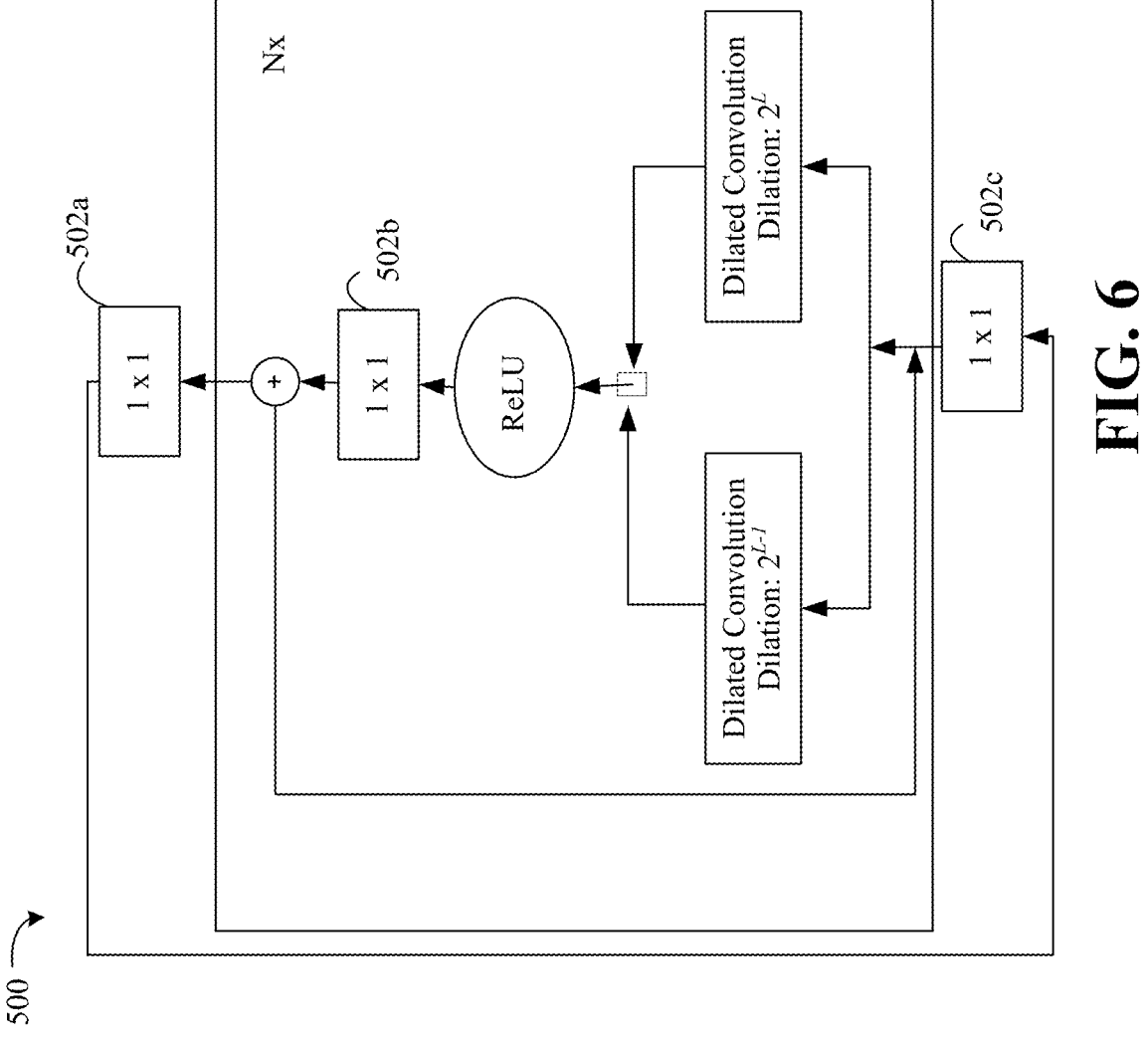
FIG. 6 is an example of an Epistemic Confidence Generation Module according to an embodiment.

FIG. 6 illustrates an ECGM 500. The ECGM 500 may generally be implemented with the embodiments described herein, for example, the multi-modal feature processing architecture 100 (FIG. 1), method 300 (FIG. 2), multi-modal feature process 350 (FIG. 3), epistemic confidence processing architecture 400 (FIG. 4) and/or method 420 (FIG. 5) already discussed. The ECGM may be readily substituted for any of the first-N confidence ECGMs 108a-108n. The ECGM 500 may be a TN and/or TCN. The ECGM 500 includes several blocks 502a, 502b, 502c to execute 1-D convolutions (labeled 1×1) with residual connections for enhanced feature processing efficiency. Each of the 1×1 blocks 502a, 502b, 502c in the ECGM 500 initially applies a 1×1 convolution for feature dimension standardization, followed by variable-size 1-D dilated convolutions. These dilated convolution operations help to increase the effective receptive field of the model, allowing the ECGM 500 to effectively learn long-range temporal dependences in the input data.

The output of the ECGM 500 is a frame-wise set of logits (corresponding with frame-wise class predictions and Equation 2 above). The ECGM 500 is trained independently for a given feature or modal type. As noted above, some embodiments train a baseline ECGM which operates on solely on the primary input modality (e.g., video stream features). All other feature-based ECGMs receive a (frame-wise) concatenation of baseline features (e.g., video stream) with a single data modality (e.g., hand localization features). Each ECGM can be trained using any generic predictive loss function, including cross-entropy, etc.

The below illustrates a comparison of performance of some embodiments to conventional designs. A dataset consists of 13 individual class actions; and a pre-trained Slow-Fast 50 3D CNN architecture extracted global frame-wise features from raw video; for the final action segmentation inference, embodiments trained a TCN Multi-Stage Temporal Convolutional Network for Action Segmentation (MSTCN)++ model and individual localization features were extracted using a pre-trained 2D ResNet-101 model in conjunction with ROI Align. Several results were generated for several baseline versions of a workflow, including MSTCN++ (non-causal), meaning that the MSTCN++ model processes video frames in contiguous blocks without being restricted to only "present" and "past" frames (e.g., such a model could be used in post hoc data analysis frameworks). MSTCN++ (causal), denotes use of the MSTCN++ models where the models only processes video frames up to the current frame for action segmentation prediction (such a model can be used in real-time inference scenarios). In Table 1 and Table 2 below, the units of the measurements (e.g., 65.29) are an accuracy metric where a higher score indicates higher degree of accuracy and/or performance. In both cases, the data below demonstrated significant performance improvements over the baseline models when using the epistemic confidence-based feature processing described herein, as shown in Tables 1 and 2.

TABLE 1

| Results using MSTCNN++ (non-causal) baseline | | | | |
|---|---|---|---|---|
| Model | Frame Acc. | F1 @ 0.10 | F1 @ 0.25 | F1 @ 0.50 |
| MSTCN++ (non-causal) | 65.29 (68.20) | 72.58 | 67.53 | 54.38 |
| MSTCN++ w/localization features (non-causal) | 68.47 (70.97) | 76.25 | 71.93 | 58.95 |
| MSTCN++ w/localization features and ECCF(non-causal) | 69.28 (72.16) | 79.21 | 74.39 | 60.56 |

TABLE 2

| Results using MSTCNN++ (causal) baseline. | | | | |
|---|---|---|---|---|
| Model | Frame Acc. | F1 @ 0.10 | F1 @ 0.25 | F1 @ 0.50 |
| MSTCN++ (causal) | 60.71 (64.61) | 72.25 | 64.59 | 48.03 |
| MSTCN++ w/localization features (causal) | 66.94 (71.70) | 72.76 | 66.66 | 49.95 |
| MSTCN++ w/localization features and ECCF(causal) | 66.07 (69.31) | 75.77 | 70.44 | 51.81 |

Figure 7:
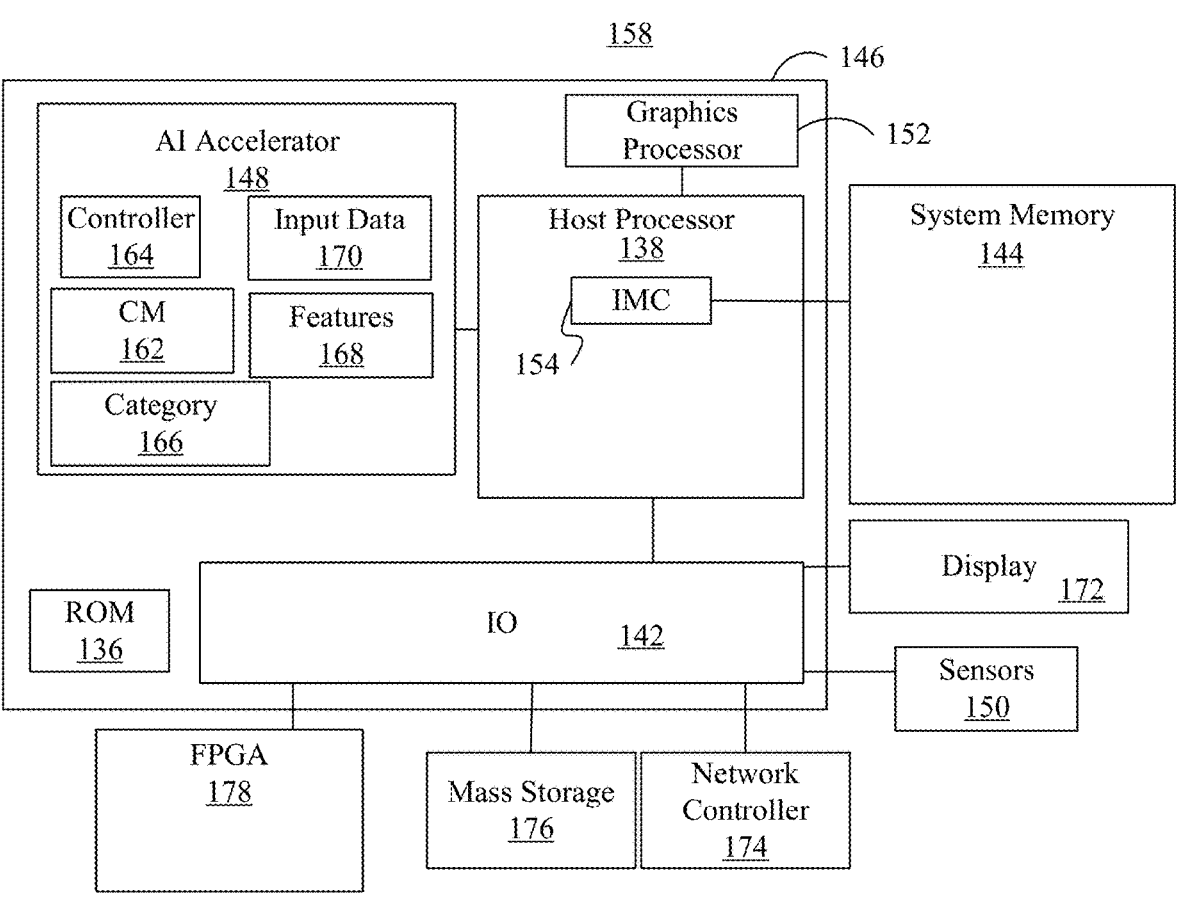
FIG. 7 is a diagram of an example of an efficiency-enhanced computing system according to an embodiment.

Turning now to FIG. 7, an efficiency-enhanced and performance-enhanced epistemic computing system 158 is shown. The computing system 158 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot, autonomous vehicle, etc.), edge device (e.g., mobile phone, desktop, etc.) etc., or any combination thereof. In the illustrated example, the computing system 158 includes a host processor 138 (e.g., CPU) having an integrated memory controller (IMC) 154 that is coupled to a system memory 144.

The illustrated computing system 158 also includes an input output (IO) module 142 implemented together with the host processor 138, the graphics processor 152 (e.g., GPU), ROM 136, and AI accelerator 148 on a semiconductor die 146 as a system on chip (SoC). The illustrated I) module 142 communicates with, for example, a display 172 (e.g., touch screen, liquid crystal display/LCD, light emitting diode/ LED display), a network controller 174 (e.g., wired and/or wireless), FPGA 178 and mass storage 176 (e.g., hard disk drive/HDD, optical disk, solid state drive/SSD, flash memory). The IO module 142 also communicates with sensors 150 (e.g., video sensors, audio sensors, proximity sensors, heat sensors, etc.). The sensors 150 may provide input data 170 to the AI accelerator 148 in real-time to facilitate processing according to embodiments as described herein. The SoC 146 may further include processors (not shown) and/or the AI accelerator 148 dedicated to artificial intelligence (AI) and/or neural network (NN) processing. For example, the system SoC 146 may include vision processing units (VPUs), and/or other AI/NN-specific processors such as AI accelerator 148, etc. In some embodiments, any aspect of the embodiments described herein may be implemented in the processors, such as the graphics processor 152 and/or the host processor 138, and in the accelerators dedicated to AI and/or NN processing such as AI accelerator 148 or other devices such as the FPGA 178.

The graphics processor 152, AI accelerator 148 and/or the host processor 138 may execute instructions 156 retrieved from the system memory 144 (e.g., a dynamic random-access memory) and/or the mass storage 176 to implement aspects as described herein. For example, a controller 164 of the AI accelerator 148 extracts features 168 from the input data 170. The controller 164 generates a confidence metric (CM) 162 for the features 168, where the CM 162 is to correspond to a degree that at least one feature of the features 168 is relevant for classification of the input data 170. The controller 164 categorizes the input data 170 into a category 166 based on the features 168 and the CM 162.

While the input data 170, features 168, CM 162, and category 166 are shown as being operated on by the controller 164 of the AI accelerator 148, it will be understood the graphics processor 152, FPGA 178, and/or host processor could process the input data 170 to generate features 168 and CM 162, and as well as to categorize the input data 170 into the category 166. When the instructions 156 are executed, the computing system 158 may implement one or more aspects of the embodiments described herein. For example, the computing system 158 may implement one or more aspects of the embodiments described herein, for example, the multi-modal feature processing architecture 100 (FIG. 1), method 300 (FIG. 2), multi-modal feature process 350 (FIG. 3), epistemic confidence processing architecture 400 (FIG. 4), method 420 (FIG. 5) and/or ECGM 500 (FIG. 6) already discussed. The illustrated computing system 158 is therefore considered to be an efficiency-enhanced at least to the extent that the computing system 158 reduces latency and energy to categorize input data and with enhanced accuracy.

Figure 8:
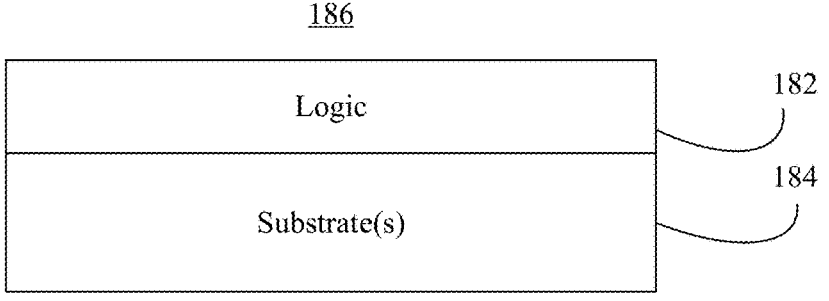
FIG. 8 is an illustration of an example of a semiconductor apparatus according to an embodiment.

FIG. 8 shows a semiconductor apparatus 186 (e.g., chip, die, package). The illustrated apparatus 186 includes one or more substrates 184 (e.g., silicon, sapphire, gallium arsenide) and logic 182 (e.g., transistor array and other integrated circuit/IC components) coupled to the substrate(s) 184. In an embodiment, the apparatus 186 is operated in an application development stage and the logic 182 performs one or more aspects of the embodiments described herein. For example, the apparatus 186 may generally implement the embodiments described herein, for example, the multi-modal feature processing architecture 100 (FIG. 1), method 300 (FIG. 2), multi-modal feature process 350 (FIG. 3), epistemic confidence processing architecture 400 (FIG. 4), method 420 (FIG. 5) and/or ECGM 500 (FIG. 6). The logic 182 may be implemented at least partly in configurable logic or fixed-functionality hardware logic. In one example, the logic 182 includes transistor channel regions that are positioned (e.g., embedded) within the substrate(s) 184. Thus, the interface between the logic 182 and the substrate(s) 184 may not be an abrupt junction. The logic 182 may also be considered to include an epitaxial layer that is grown on an initial wafer of the substrate(s) 184.

Figure 9:
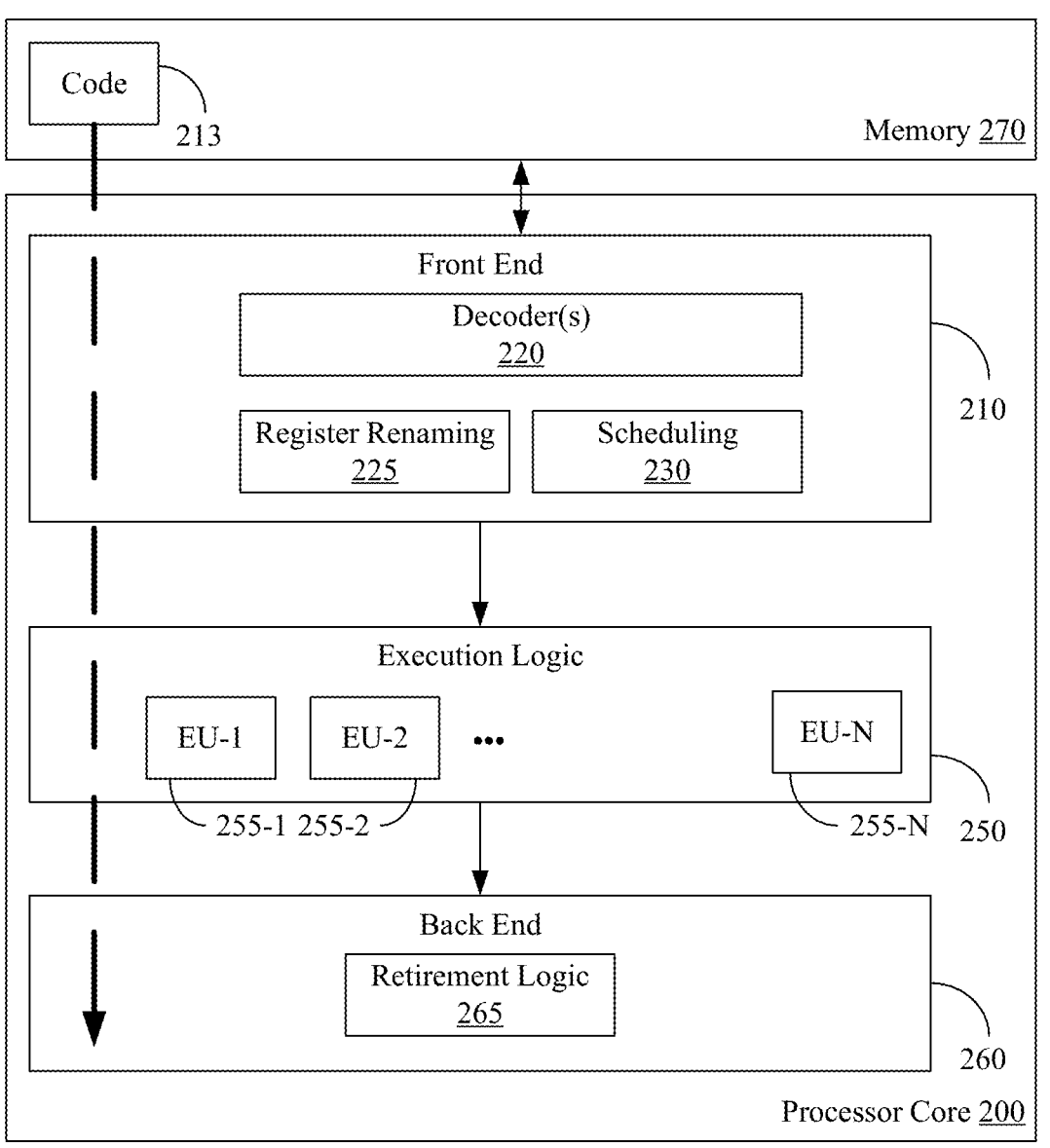
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the embodiments such as, for example, the multi-modal feature processing architecture 100 (FIG. 1), method 300 (FIG. 2), multi-modal feature process 350 (FIG. 3), epistemic confidence processing architecture 400 (FIG. 4), method 420 (FIG. 5) and/or ECGM 500 (FIG. 6), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include several execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back-end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 10:
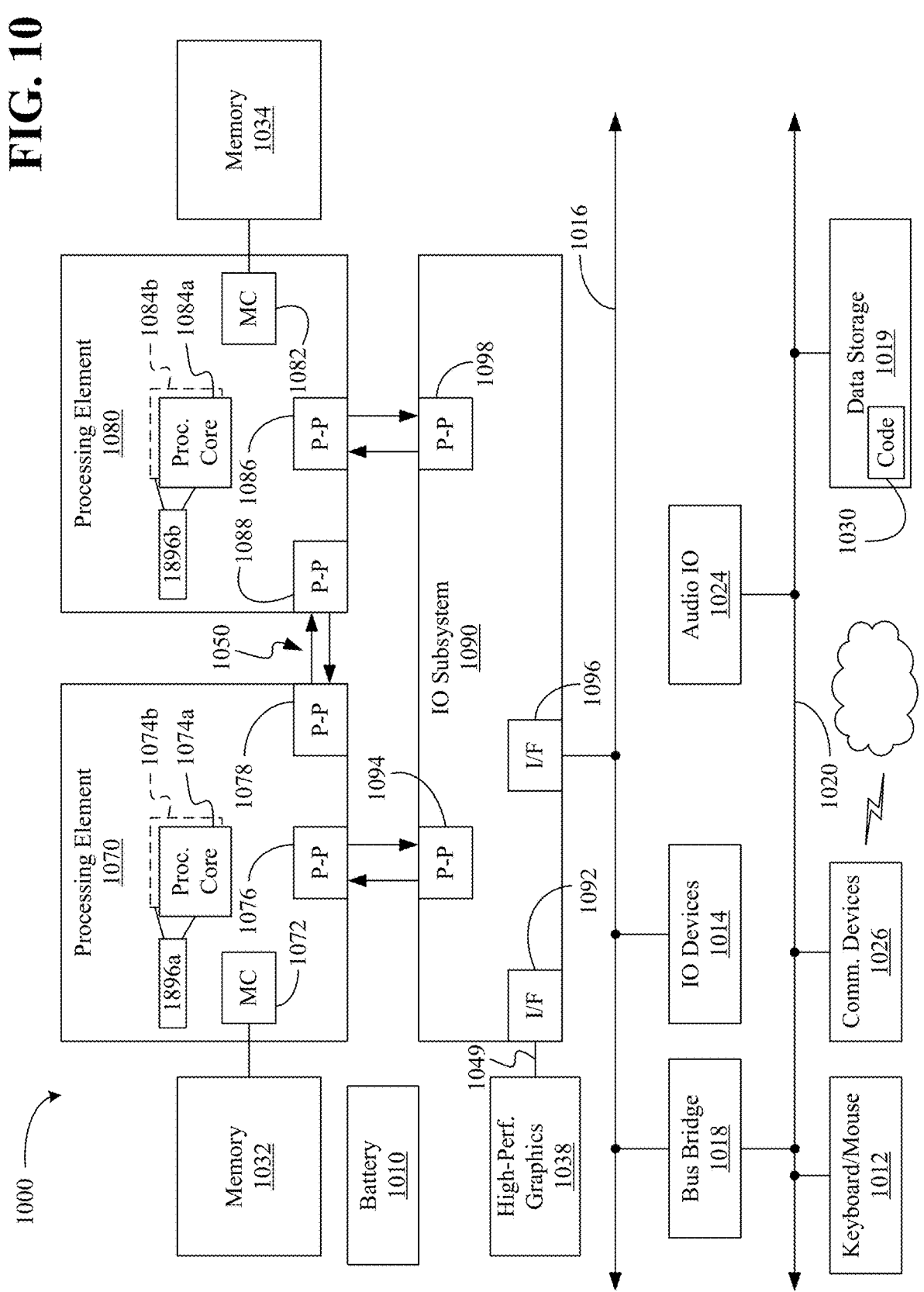
FIG. 10 is a block diagram of an example of a multi-processor based computing system according to an embodiment.

Referring now to FIG. 10, shown is a block diagram of a computing system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood any or all the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner like that discussed above in connection with FIG. 9.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments is not so limited.

As shown in FIG. 10, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the one or more aspects of such as, for example, the multi-modal feature processing architecture 100 (FIG. 1), method 300 (FIG. 2), multi-modal feature process 350 (FIG. 3), epistemic confidence processing architecture 400 (FIG. 4), method 420 (FIG. 5) and/or ECGM 500 (FIG. 6) already discussed. Further, an audio I/O 1024 may be coupled to second bus 1020 and a battery 1010 may supply power to the computing system 1000.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

Additional Notes and Examples

Example 1 includes a computing system comprising a data storage that is to store input data, and a controller implemented in one or more of configurable logic or fixed-functionality logic hardware, wherein the controller is to extract a plurality of features from the input data, generate a confidence metric for the plurality of features, wherein the confidence metric is to correspond to a degree that at least one feature of the plurality of features is relevant for classification of the input data, and categorize the input data into a category based on the plurality of features and the confidence metric.

Example 2 includes the computing system of Example 1, wherein the controller is to generate a weighting array for the plurality of features based on the confidence metric.

Example 3 includes the computing system of Example 2, wherein the controller is further to weight the plurality of features based on the weighting array to generate weighted features, and wherein to categorize the input data, the controller is to process the weighted features with a temporal network.

Example 4 includes the computing system of Example 1, wherein the confidence metric includes confidence metrics, and further wherein the controller is further to generate a baseline metric associated with baseline features of the input data, generate weights based on a comparison of the baseline metric to the confidence metrics, and adjust the plurality of features based on the weights to generate weighted features, and wherein to categorize the input data, the controller is to process the weighted features with a temporal network.

Example 5 includes the computing system of Example 4, wherein to generate the weights, the controller is further to identify a difference between a first confidence metric of the confidence metrics and the baseline metric, determine whether the difference meets a threshold, when the difference meets the threshold, set a first weight of the weights associated with the first confidence metric to a first value, wherein the first value is determined based on the difference, and when the difference fails to meet the threshold, set the first weight to a predetermined value.

Example 6 includes the computing system of any one of Examples 1 to 5, wherein the category is an action category, the input data is further associated with a plurality of data modalities, and the input data includes one or more of sensor data, audio data, language data, hand tracking data, video stream data, object localization data, or semantic segmentation data, to extract the plurality of features, the controller is to process the input data with a convolutional neural network, and the plurality of features is associated with a same video frame.

Example 7 includes a semiconductor apparatus, the semiconductor apparatus comprising one or more substrates, and logic coupled to the one or more substrates, wherein the logic is implemented in one or more of configurable logic or fixed-functionality logic hardware, the logic coupled to the one or more substrates to extract a plurality of features from input data, generate a confidence metric for the plurality of features, wherein the confidence metric is to correspond to a degree that at least one feature of the plurality of features is relevant for classification of the input data, and categorize the input data into a category based on the plurality of features and the confidence metric.

Example 8 includes the apparatus of Example 7, wherein the logic coupled to the one or more substrates is to generate a weighting array for the plurality of features based on the confidence metric.

Example 9 includes the apparatus of Example 8, wherein the logic coupled to the one or more substrates is to weight the plurality of features based on the weighting array to generate weighted features, wherein to categorize the input data, the logic coupled to the one or more substrates is to process the weighted features with a temporal network.

Example 10 includes the apparatus of Example 7, wherein the confidence metric includes confidence metrics, wherein the logic coupled to the one or more substrates is to generate a baseline metric associated with baseline features of the input data, generate weights based on a comparison of the baseline metric to the confidence metrics, and adjust the plurality of features based on the weights to generate weighted features, and wherein to categorize the input data, the logic coupled to the one or more substrates is to process the weighted features with a temporal network.

Example 11 includes the apparatus of Example 10, wherein to generate the weights, the logic coupled to the one or more substrates is further to identify a difference between a first confidence metric of the confidence metrics and the baseline metric, determine whether the difference meets a threshold, when the difference meets the threshold, set a first weight of the weights associated with the first confidence metric to a first value, wherein the first value is determined based on the difference, and when the difference fails to meet the threshold, set the first weight to a predetermined value.

Example 12 includes the apparatus of any one of Examples 7 to 11, wherein the category is an action category, the input data is further associated with a plurality of data modalities, and the input data includes one or more of sensor data, audio data, language data, hand tracking data, video stream data, object localization data, or semantic segmentation data, to extract the plurality of features, the logic coupled to the one or more substrates is to process the input data with a convolutional neural network, and the plurality of features is associated with a same video frame.

Example 13 includes the apparatus of any one of Examples 7 to 12, wherein the logic coupled to the one or more substrates includes transistor channel regions that are positioned within the one or more substrates.

Example 14 includes at least one computer readable storage medium comprising a set of executable program instructions, which when executed by a computing system, cause the computing system to extract a plurality of features from input data, generate a confidence metric for the plurality of features, wherein the confidence metric is to correspond to a degree that at least one feature of the plurality of features is relevant for classification of the input data, and categorize the input data into a category based on the plurality of features and the confidence metric Example 15 includes the at least one computer readable storage medium of Example 14, wherein the instructions, when executed, further cause the computing system to generate a weighting array for the plurality of features based on the confidence metric.

Example 16 includes the at least one computer readable storage medium of Example 15, wherein the instructions, when executed, further cause the computing system to weight the plurality of features based on the weighting array to generate weighted features, and wherein to categorize the input data, the instructions, when executed, further cause the computing system to process the weighted features with a temporal network.

Example 17 includes the at least one computer readable storage medium of Example 14, wherein the confidence metric includes confidence metrics, wherein the instructions, when executed, further cause the computing system to generate a baseline metric associated with baseline features of the input data, generate weights based on a comparison of the baseline metric to the confidence metrics, and adjust the plurality of features based on the weights to generate weighted features, and wherein to categorize the input data, the instructions, when executed, further cause the computing system to process the weighted features with a temporal network.

Example 18 includes the at least one computer readable storage medium of Example 17, wherein to generate the weights, the instructions, when executed, further cause the computing system to identify a difference between a first confidence metric of the confidence metrics and the baseline metric, determine whether the difference meets a threshold, when the difference meets the threshold, set a first weight of the weights associated with the first confidence metric to a first value, wherein the first value is determined based on the difference, and when the difference fails to meet the threshold, set the first weight to a predetermined value.

Example 19 includes the at least one computer readable storage medium of any one of Examples 14 to 18, wherein the category is an action category, the input data is further associated with a plurality of data modalities, and the input data includes one or more of sensor data, audio data, language data, hand tracking data, video stream data, object localization data, or semantic segmentation data, to extract the plurality of features, the instructions, when executed, further cause the computing system to process the input data with a convolutional neural network, and the plurality of features is associated with a same video frame.

Example 20 includes a method comprising extracting a plurality of features from input data, generating a confidence metric for the plurality of features, wherein the confidence metric corresponds to a degree that at least one feature of the plurality of features is relevant for classification of the input data, and categorizing the input data into a category based on the plurality of features and the confidence metric.

Example 21 includes the method of Example 20, further comprising generating a weighting array for the plurality of features based on the confidence metric.

Example 22 includes the method of Example 21, further comprising weighting the plurality of features based on the weighting array to generate weighted features, and wherein the categorizing comprises processing the weighted features with a temporal network.

Example 23 includes the method of Example 20, wherein the confidence metric includes confidence metrics, wherein the method further comprises generating a baseline metric associated with baseline features of the input data, generating weights based on a comparison of the baseline metric to the confidence metrics, and adjusting the plurality of features based on the weights to generate weighted features, and wherein the categorizing comprises processing the weighted features with a temporal network.

Example 24 includes the method of Example 23, wherein the generating the weights comprises identifying a difference between a first confidence metric of the confidence metrics and the baseline metric, determining whether the difference meets a threshold, when the difference meets the threshold, setting a first weight of the weights associated with the first confidence metric to a first value, wherein the first value is determined based on the difference, and when the difference fails to meet the threshold, setting the first weight to a predetermined value.

Example 25 includes the method of Example 20 to 24, wherein the category is an action category, the input data is further associated with a plurality of data modalities, and the input data includes one or more of sensor data, audio data, language data, hand tracking data, video stream data, object localization data, or semantic segmentation data, the extracting the plurality of features comprises processing the input data with a convolutional neural network, and the plurality of features is associated with a same video frame.

Example 26 includes a semiconductor apparatus comprising means for extracting a plurality of features from input data, means for generating a confidence metric for the plurality of features, wherein the confidence metric corresponds to a degree that at least one feature of the plurality of features is relevant for classification of the input data, and means for categorizing the input data into a category based on the plurality of features and the confidence metric.

Example 27 includes the apparatus of Example 26, further comprising means for generating a weighting array for the plurality of features based on the confidence metric.

Example 28 includes the apparatus of Example 27, further comprising means for weighting the plurality of features based on the weighting array to generate weighted features, and wherein the categorizing comprises processing the weighted features with a temporal network.

Example 29 includes the apparatus of Example 26, wherein the confidence metric includes confidence metrics, wherein the apparatus further comprises means for generating a baseline metric associated with baseline features of the input data, means for generating weights based on a comparison of the baseline metric to the confidence metrics, and means for adjusting the plurality of features based on the weights to generate weighted features, and wherein the categorizing comprises processing the weighted features with a temporal network.

Example 30 includes the apparatus of Example 29, wherein the means for generating the weights comprises means for identifying a difference between a first confidence metric of the confidence metrics and the baseline metric, means for determining whether the difference meets a threshold, means for when the difference meets the threshold, setting a first weight of the weights associated with the first confidence metric to a first value, wherein the first value is determined based on the difference, and means for when the difference fails to meet the threshold, setting the first weight to a predetermined value.

Example 31 includes the apparatus of Example 26 to 29, wherein the category is an action category, the input data is further associated with a plurality of data modalities, and the input data includes one or more of sensor data, audio data, language data, hand tracking data, video stream data, object localization data, or semantic segmentation data, the means for extracting the plurality of features comprises means for processing the input data with a convolutional neural network, and the plurality of features is associated with a same video frame.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical, or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
   a data storage that is to store input data; and
   a controller implemented in one or more of configurable logic or fixed-functionality logic hardware, wherein the controller is to:
      extract a plurality of features from the input data,
      generate a confidence metric for the plurality of features, wherein the confidence metric is to correspond to a degree that at least one feature of the plurality of features is relevant for classification of the input data, and
      categorize the input data into a category based on the plurality of features and the confidence metric.

2. The computing system of claim 1, wherein the controller is to:
   generate a weighting array for the plurality of features based on the confidence metric.

3. The computing system of claim 2, wherein the controller is further to:
   weight the plurality of features based on the weighting array to generate weighted features, and
   wherein to categorize the input data, the controller is to process the weighted features with a temporal network.

4. The computing system of claim 1, wherein the confidence metric includes confidence metrics, and further wherein the controller is further to:
   generate a baseline metric associated with baseline features of the input data;
   generate weights based on a comparison of the baseline metric to the confidence metrics; and
   adjust the plurality of features based on the weights to generate weighted features, and
   wherein to categorize the input data, the controller is to process the weighted features with a temporal network.

5. The computing system of claim 4, wherein to generate the weights, the controller is further to:

identify a difference between a first confidence metric of the confidence metrics and the baseline metric;

determine whether the difference meets a threshold;

when the difference meets the threshold, set a first weight of the weights associated with the first confidence metric to a first value, wherein the first value is determined based on the difference; and when the difference fails to meet the threshold, set the first weight to a predetermined value.

6. The computing system of claim 1, wherein:

the category is an action category;

the input data is further associated with a plurality of data modalities, and the input data includes one or more of sensor data, audio data, language data, hand tracking data, video stream data, object localization data, or semantic segmentation data;

to extract the plurality of features, the controller is to process the input data with a convolutional neural network; and the plurality of features is associated with a same video frame.

7. A semiconductor apparatus, the semiconductor apparatus comprising:

one or more substrates; and logic coupled to the one or more substrates, wherein the logic is implemented in one or more of configurable logic or fixed-functionality logic hardware, the logic coupled to the one or more substrates to:

extract a plurality of features from input data;

generate a confidence metric for the plurality of features, wherein the confidence metric is to correspond to a degree that at least one feature of the plurality of features is relevant for classification of the input data; and categorize the input data into a category based on the plurality of features and the confidence metric.

8. The apparatus of claim 7, wherein the logic coupled to the one or more substrates is to:

generate a weighting array for the plurality of features based on the confidence metric.

9. The apparatus of claim 8, wherein the logic coupled to the one or more substrates is to:

weight the plurality of features based on the weighting array to generate weighted features, wherein to categorize the input data, the logic coupled to the one or more substrates is to process the weighted features with a temporal network.

10. The apparatus of claim 7, wherein the confidence metric includes confidence metrics, wherein the logic coupled to the one or more substrates is to:

generate a baseline metric associated with baseline features of the input data;

generate weights based on a comparison of the baseline metric to the confidence metrics; and adjust the plurality of features based on the weights to generate weighted features, and wherein to categorize the input data, the logic coupled to the one or more substrates is to process the weighted features with a temporal network.

11. The apparatus of claim 10, wherein to generate the weights, the logic coupled to the one or more substrates is further to:

identify a difference between a first confidence metric of the confidence metrics and the baseline metric;

determine whether the difference meets a threshold;

when the difference meets the threshold, set a first weight of the weights associated with the first confidence metric to a first value, wherein the first value is determined based on the difference; and when the difference fails to meet the threshold, set the first weight to a predetermined value.

12. The apparatus of claim 7, wherein:

the category is an action category;

the input data is further associated with a plurality of data modalities, and the input data includes one or more of sensor data, audio data, language data, hand tracking data, video stream data, object localization data, or semantic segmentation data;

to extract the plurality of features, the logic coupled to the one or more substrates is to process the input data with a convolutional neural network; and the plurality of features is associated with a same video frame.

13. The apparatus of claim 7, wherein the logic coupled to the one or more substrates includes transistor channel regions that are positioned within the one or more substrates.

14. At least one computer readable storage medium comprising a set of executable program instructions, which when executed by a computing system, cause the computing system to:

extract a plurality of features from input data;

generate a confidence metric for the plurality of features, wherein the confidence metric is to correspond to a degree that at least one feature of the plurality of features is relevant for classification of the input data; and categorize the input data into a category based on the plurality of features and the confidence metric.

15. The at least one computer readable storage medium of claim 14, wherein the instructions, when executed, further cause the computing system to:

generate a weighting array for the plurality of features based on the confidence metric.

16. The at least one computer readable storage medium of claim 15, wherein the instructions, when executed, further cause the computing system to:

weight the plurality of features based on the weighting array to generate weighted features, and wherein to categorize the input data, the instructions, when executed, further cause the computing system to process the weighted features with a temporal network.

17. The at least one computer readable storage medium of claim 14, wherein the confidence metric includes confidence metrics, wherein the instructions, when executed, further cause the computing system to:

generate a baseline metric associated with baseline features of the input data;

generate weights based on a comparison of the baseline metric to the confidence metrics; and adjust the plurality of features based on the weights to generate weighted features, and wherein to categorize the input data, the instructions, when executed, further cause the computing system to process the weighted features with a temporal network.

18. The at least one computer readable storage medium of claim 17, wherein to generate the weights, the instructions, when executed, further cause the computing system to:

identify a difference between a first confidence metric of the confidence metrics and the baseline metric;

determine whether the difference meets a threshold;

when the difference meets the threshold, set a first weight of the weights associated with the first confidence metric to a first value, wherein the first value is determined based on the difference; and when the difference fails to meet the threshold, set the first weight to a predetermined value.

19. The at least one computer readable storage medium of claim 14, wherein:

the category is an action category;

the input data is further associated with a plurality of data modalities, and the input data includes one or more of sensor data, audio data, language data, hand tracking data, video stream data, object localization data, or semantic segmentation data;

to extract the plurality of features, the instructions, when executed, further cause the computing system to process the input data with a convolutional neural network; and the plurality of features is associated with a same video frame.

20. A method comprising:

extracting a plurality of features from input data;

generating a confidence metric for the plurality of features, wherein the confidence metric corresponds to a degree that at least one feature of the plurality of features is relevant for classification of the input data; and categorizing the input data into a category based on the plurality of features and the confidence metric.

21. The method of claim 20, further comprising:

generating a weighting array for the plurality of features based on the confidence metric.

22. The method of claim 21, further comprising:

weighting the plurality of features based on the weighting array to generate weighted features, and wherein the categorizing comprises processing the weighted features with a temporal network.

23. The method of claim 20, wherein the confidence metric includes confidence metrics, wherein the method further comprises:

generating a baseline metric associated with baseline features of the input data;

generating weights based on a comparison of the baseline metric to the confidence metrics; and adjusting the plurality of features based on the weights to generate weighted features, and wherein the categorizing comprises processing the weighted features with a temporal network.

24. The method of claim 23, wherein the generating the weights comprises:

identifying a difference between a first confidence metric of the confidence metrics and the baseline metric;

determining whether the difference meets a threshold;

when the difference meets the threshold, setting a first weight of the weights associated with the first confidence metric to a first value, wherein the first value is determined based on the difference; and when the difference fails to meet the threshold, setting the first weight to a predetermined value.

25. The method of claim 20, wherein:

the category is an action category;

the input data is further associated with a plurality of data modalities, and the input data includes one or more of sensor data, audio data, language data, hand tracking data, video stream data, object localization data, or semantic segmentation data;

the extracting the plurality of features comprises processing the input data with a convolutional neural network; and the plurality of features is associated with a same video frame.

\* \* \* \* \*